Patented Mar. 28, 1939

2,151,769

UNITED STATES PATENT OFFICE 2,151,769

HYDROGENATED TERPENE ETHER

Irvin W. Humphrey, Wilmington, Del., assignor to Hercules Powder Company, Wilmington, Del., a corporation of Delaware No Drawing. Application October 13, 1937, Serial No. 168,843

16 Claims. (Cl. 260—611)

This invention relates to a method for the production of a new type of terpene ether and to the product thereof. More particularly it relates to a method for the production of a hydrogenated terpene ether, and to the product thereof.

The method in accordance with this invention consists of reacting an alcohol at a double bond of an unsaturated terpene compound to form an ether and eliminate a part of the unsaturation, and then hydrogenating the product to reduce or eliminate the remaining unsaturation of the compound. The terpene ether thus produced is stable to oxidation and to the action of light, and suitable for a variety of uses. Such ethers will be termed "hydrogenated additive" terpene ethers to distinguish them from ethers produced by reaction involving a hydroxyl group of a terpene alcohol. The intermediate products which have not been hydrogenated will be termed "additive" terpene ethers.

The terpene compound reacted by the method in accordance with this invention may be an unsaturated monocyclic terpene compound such as, for example, dipentene, terpinene, terpinolene, phellandrene, sylvestrene, also, alpha-terpineol, beta-terpineol, terpinenol, or other unsaturated monocyclic terpene alcohol, or mixtures thereof; it may be an unsaturated complex cyclic terpene capable of isomerization to an unsaturated monocyclic terpene compound, which may be, for example, alpha pinene, carene, etc. or it may be a bicyclic terpene which is not readily isomerized under the conditions of the reaction, such as, for example, nopinene, camphene and bornylene. Polymerized terpenes, as for example, terpenes produced by the polymerization of pinene, dipentene, terpinene, etc. may also be reacted by the method in accordance with this invention. It will be found, however, that such polymerized terpenes react less readily than unpolymerized terpenes.

These terpene compounds need not be in the form of pure compounds to be treated in accordance with this invention, but may be reacted in crude form. Thus, in place of the several pure terpene compounds, crude natural mixtures of terpene compounds, as for example, turpentine, pine oil, etc., or mixtures of terpenes with petroleum or other hydrocarbons, may be used. Various fractions from these mixtures may also be used without the necessity of isolating the compounds in their pure state after the etherification of a crude mixture of terpene compounds or a mixture of terpene compounds. The products may be separated from the unreacted components of the reaction mixture by fractional distillation, by extraction with a selective solvent for the ether or unreacted alcohol which is substantially immiscible with the reaction mixture, or by a combination of these methods.

The alcohol used to produce the terpene ethers in accordance with this invention may be either monohydric or polyhydric. Suitable polyhydric alcohols are, for example, ethylene glycol, propylene glycol, butylene glycol, isobutylene glycol, a polyglycol as diethylene glycol, triethylene glycol, dipropylene glycol, dibutylene glycol, propyleneethylene glycol, isobutylene-ethylene glycol, trimethylene glycol; the monoethyl, monopropyl or monobutyl ethers of glycerol, etc.: nitroisobutyl glycerol, nitroisobutyl glycol, glycerol, glycerol mono-acetate, mannitol, sorbitol, xylose, etc., or mixtures thereof. Monohydric alcohols such as, for example, methyl alcohol, ethyl alcohol, normal propyl alcohol, iso-propyl alcohol, normal butyl alcohol, secondary butyl alcohol, amyl alcohol, ethylene chlorohydrin, tetrahydro-furfuryl alcohol, benzyl alcohol, lauryl alcohol, stearyl alcohol, cyclohexanol, hexyl alcohol, octyl alcohol, furfuryl alcohol, cetyl alcohol, oleyl alcohol, abietyl alcohol, pimarol, hydrogenated abietyl alcohol, hydropimarol, hydrogenated pyroabietyl alcohol, pyroabietyl alcohol; the mono-ethyl, mono-butyl, mono-methyl ether of dihydric alcohols as ethylene, propylene, or diethylene glycol; the corresponding mono- or di-ethers of a trihydric alcohol, as, glycerol; methyl isobutyl carbinol, dodecyl alcohol, fenchyl alcohol, borneol, hydroxy stearic acid, naphthenyl alcohol, etc., or mixtures thereof may be reacted with terpene compounds, in accordance with the method of this invention, to produce additive terpene ethers. The alcohol employed in the reaction will preferably be anhydrous, or substantially so.

The additive terpene ether which forms the intermediate in the production of a hydrogenated additive terpene in accordance with this invention and, likewise, the hydrogenated additive terpene ether may be monomeric or polymeric in nature. Furthermore, it may be purely an ether in character, or it may be an ether-ester in character. Additive terpene ether-esters may be obtained by the etherification of one or more hydroxyl groups of a polyhydric alcohol by reaction of a double bond of an unsaturated terpene and the esterification of another hydroxyl group of the polyhydric alcohol with an organic acid. Examples of such mixed ether-esters are diethylene glycol terpinyl ether acetate, ethylene glycol terpinyl ether butyrate, terpinyl glycerol monoacetate, ethylene glycol terpinyl phthalate, ethylene glycol terpinyl maleate, glycol terpinyl abietate, etc. They may also be ether-alcohols in character. Similar additive terpene ethers may also be obtained by reacting a terpene with the free alcoholic hydroxyl of an ester or an acid, as hydroxystearic acid, ricinoleic acid, methyl ricinoleate, hydroxy-butyric acid, hydroxy-succinic acid, lactic acid, ethyl lactate, etc. Ether-alcohols may be formed by the incomplete reaction of the hydroxyls of a polyhydric alcohol with an unsaturated terpene or by the reaction of an alcohol with an unsaturated terpene alcohol.

The reaction between the alcohol and the unsaturated terpene compound to produce the "additive" terpene ethers will preferably be carried out in the presence of a suitable catalyst, such as, for example, an inorganic acid, as sulfuric acid, phosphoric acid, etc.; an organic substituted inorganic sulfur acid, as, p-toluene sulfonic acid, phenol sulfonic acid, benzene sulfonic acid, ethyl sulfuric acid, propyl sulfuric acid, butyl sulfuric acid, benzene disulfonic acid, naphthalene disulfonic acid, phenol disulfonic acid, etc., a sulfonic acid derived from a natural resin acid, or from one of its derivatives, as, abietyl sulfonic acid, hydrogenated abietyl sulfonic acid, etc.; acid inorganic salts, as, sodium acid sulfate, sodium acid phosphate, ammonium acid sulfate, etc.

The relative proportions of the alcohol and the terpene compound used in the reaction mixture will depend on the molecular weight of the alcohol. To obtain the highest yields of the terpene ether, it is desirable to use not less than one and one-half mols and preferably at least three mols of the aliphatic alcohol per mol of the terpene compound.

The concentration of catalyst used in the reaction may be varied over a wide range. Thus, the amount of catalyst used, calculated as sulfonic acid, may be within the range of about 0.1% to about 25.0% of the weight of alcohol contained in the reaction mixture. The preferred amount of catalyst will depend on the particular catalyst employed, and on the particular alcohol and the particular terpene compound reacted. When using an organic substituted inorganic sulfur acid as a catalyst, it is preferably used in amounts within the range of about 1% to about 10% by weight.

The temperature at which the reaction is carried out will depend largely upon the particular terpene and alcohol being reacted and upon the catalyst present, and may be varied over a range of about 30° C. to about 200° C. From the standpoint of yield, reaction velocity and operating simplicity, it is generally preferable to maintain the temperature of the reaction mixture within the range of about 75° C. to about 150° C. when utilizing a sulfonic acid catalyst.

The unsaturation of the "additive" terpene ether will be reduced or eliminated, in accordance with this invention, by contact with hydrogen in the presence of a hydrogenation catalyst, such as, for example, platinum, palladium, nickel, etc. The "additive" terpene ether which is hydrogenated may be any of those hereinbefore described, or mixtures thereof. Thus, they may be either of monocyclic or complex cyclic unsaturated terpenes with monohydric or polyhydric alcohols. They may be purely ethers in character, ether-esters or ether-alcohols, and they may be monomeric or polymeric in character. I may hydrogenate crude ether mixtures resulting from the formation of additive ethers by the reaction of crude terpene cuts, and I may hydrogenate mixtures of terpene ethers of different alcohols.

Contact between the terpene ether, the catalyst, and hydrogen can be accomplished by agitating the terpene ether with the catalyst in powder form in the presence of hydrogen. Alternately, a stationary hydrogenation catalyst may be employed, and the terpene ether and hydrogen passed through or over it.

When using a noble metal hydrogenation catalyst, such as, for example, platinum, palladium, etc., the hydrogenation reaction may be carried out at room temperature and under a comparatively low hydrogen pressure. When employing a base metal hydrogenation catalyst, such as, for example, nickel, or nickel in conjunction with cobalt, copper, etc., hydrogen pressures within the range of about 10 to about 1000 atmospheres per square inch will desirably be used. Ordinarily, a pressure within the range of about 25 to about 200 atmospheres will be found satisfactory. Hydrogenation may be conducted at a temperature within the range of about 50 to about 200° C., and preferably at a temperature within the range of about 75° C. to about 140° C., when using a base metal hydrogenation catalyst.

The time of hydrogenation will vary with the temperature, the hydrogen pressure, the activity of the catalyst used, the degree of saturation desired, etc., and is usually within the period of about 0.3 to about 2.5 hours. The terpene ether may, if desired, be hydrogenated in solution in an inert solvent, such as, for example, an alcohol, mineral spirits, etc.

The procedure for the production of hydrogenated terpene ethers in accordance with this invention is illustrated by the examples which follow. Of these examples, Examples I to XII illustrate the production of unsaturated terpene ethers, suitable for hydrogenation in accordance with this invention, while Examples XIII and XIV specifically illustrate the hydrogenation of such ethers by the process in accordance with this invention.

*Example I*

One hundred parts by weight of alpha-pinene, 200 parts by weight of methanol and one part by weight of p-toluene sulfonic acid were refluxed at 75° C. for thirty hours. The reaction mixture was then washed with water to remove any unreacted methanol and steam-distilled to give a fraction of 95 parts, which analyzed 6.6% methoxy, or a content of 36% of terpene ethers, and a second higher boiling fraction of 5 parts. Neither fraction had the odor characteristic of alpha-pinene. Equally good results were obtained by treatment of the same reaction mixture for 8 hours in an autoclave at a temperature of 140°–150° C.

*Example II*

Five hundred forty parts by weight of alpha-pinene, 120 parts by weight of ethylene glycol, and 1.2 parts by weight p-toluene sulfonic acid were refluxed 70 hours at a maximum temperature of 145° C. After washing with water to remove the unreacted ethylene glycol, the reaction mixture was fractionated to yield a fraction of 100 parts and a higher boiling fraction of 20 parts. The first of these fractions analyzed 3.8% hydroxyl, showing it to be a mixture of mono- and di-terpene ethers of glycol.

*Example III*

One hundred parts by weight of technical alpha terpinene, 200 parts by weight of methanol, and 1 part by weight of p-toluene sulfonic acid were refluxed under atmospheric pressure for a period of about thirty-five hours. The reaction mixture was then fractionated to produce 95 parts of a fraction which contained 38% ethers.

*Example IV*

One thousand grams of ethylene glycol, 1700 grams of alpha-pinene and 25 grams of benzene sulfonic acid were agitated at 40–60° C. for five hours, and the product worked up as in Example II. A yield of 675 grams of glycol terpene ethers (specific gravity 0.982) was secured.

*Example V*

One thousand grams of methanol, 10 cc. of phenol sulfonic acid and 1000 cc. of dipentene were refluxed for a period of 7 hours. The mixture was then cooled, the oily layer separated and washed with water. The oily layer was then fractionated over caustic in vacuo to obtain the following fractions:

(a) A mixture of dipentene, terpinene, terpinolene.
(b) Terpinyl methyl ether containing a small amount of 1,8-di-methoxy menthane. The yield of this fraction was 90% on the basis of the dipentene used.

*Example VI*

Two thousand grams of dipentene were agitated with 2000 grams of a methanol-acid solution containing 20% sulfuric acid for a period of about five hours and at a temperature of 40–50° C. The reaction was not exothermic but heat had to be added to maintain the temperature. After the period of agitation, the reaction mixture was allowed to separate into two phases. The oily layer mixture was recovered, washed with caustic solution and distilled in vacuo. A yield of 2450 grams was secured, which analyzed 75% terpene ethers and 25% of a mixture of terpinene and dipentene.

*Example VII*

Two thousand five hundred parts by volume of alpha terpineol was mixed with 1500 parts by volume of a methyl alcohol-sulfuric acid solution containing 15–25% sulfuric acid, to produce a homogeneous solution. This solution was then warmed to 25–40° C. and held at this temperature with agitation for a period of twelve hours. The reaction mixture was then washed with water, and then steam distilled over caustic in vacuo. The steam distilled product was then fractionated to give four fractions, which give analyses as follows:

First fraction—dipentene, terpinene, terpinolene—yields 10–15%.
Second fraction—terpinyl methyl ether—yield 10–15%.
Third fraction—terpineol (unreacted)—yield 25–30%.
Fourth fraction—1,8-di-methoxymenthane and 1-methoxymenthane-8-ol—yield 35–50%. The fourth cut had a specific gravity of 0.955 and a boiling range of 228–245° C. The two ethers were separated by fractionation. The 1,8-di-methoxymenthane boils at 230–232° C. and 1-methoxymenthane-8-ol boils at 244–246° C. under atmospheric pressure.

*Example VIII*

Two thousand grams of alpha-pinene were added to 2000 grams of methanol containing 10% sulfuric acid by weight, while cooling externally with water. The reaction is exothermic, hence the pinene was added at such a rate as would allow a maximum temperature of the reaction mixture of 50° C. Thirty minutes were required for the complete addition of the pinene. The mixture was then agitated for an additional three hours, and the oil layer allowed to separate. This layer was then recovered, washed with caustic soda, and then distilled in vacuo. The yield was about 2400 grams of a crude ether mixture, which was approximately 50% terpinyl methyl ether having a boiling point of 212–214° C. The remaining 50% was a mixture of 1,8-dimethoxy-menthane boiling at 228–232° C. and bornylmethyl ether boiling at 192–193° C.

*Example IX*

Five thousand parts by volume of pure wood turpentine (90–95% alpha-pinene) were added to a mixture of 2400 parts methanol and 500 parts 93–95% sulfuric acid. The mixture was then agitated and warmed to 35° C. to start the reaction, which is exothermic due to the isomerization of the bicyclic alpha-pinene to a mono-cyclic terpinyl form. The temperature of the reaction mixture was held by cooling to a maximum of 45° C., with continued agitation for a period of about three hours. The oily layer was then allowed to separate and removed from the reaction mixture. It was then washed with water and fractionated over caustic in vacuo, fractionation of this crude product gave two cuts. One of these fractions was composed of a mixture of dipentene, terpinene, terpinolene, and made up about 30% of the yield on the basis of the original turpentine. The other fraction was a mixture of a terpene ethers including terpinyl-methyl ether, 1,8-dimethoxymenthane and bornylmethyl ether.

*Example X*

A mixture of isopropyl terpene ethers was prepared from wood turpentine following the procedure of Example IV, except with the substitution of 3500 parts of isopropyl alcohol for the 2400 parts of methanol used in that example. Due to the solubility of the isopropyl alcohol in the reaction product, it is convenient to separate the unreacted excess from the reaction mixture by washing with water. Fractionation of the oil phase of the reaction mixture yields some isopropyl alcohol, a mixture of dipentene, terpinene and terpinolene, and a mixture of isopropyl terpene ethers. The mixture of ethers was obtained in yields of about 50% on the basis of the original turpentine. It had a specific gravity of about 0.918 and a boiling range of 200–216° C.

*Example XI*

Five hundred cc. of alpha-pinene, 500 cc. of butyl alcohol and 25 cc. of methyl sulfuric acid were agitated at 40–60° C. for five hours. The product was then washed with water and then distilled over caustic in vacuo to obtain the obtain the following fractions:

(a) Butyl alcohol.
(b) Dipentene, terpinene, terpinolene mixture.
(c) Terpinyl butyl ether cut (300 cc.) B. P. 230–250° C.
(d) A small residue of about 5%.

*Example XII*

One hundred grams of methanol, 10 cc. of phenol sulfonic acid and 1000 cc. of dipentene were refluxed for a period of 7 hours. The mixture was then cooled, the oily layer separated and washed with water. The oily layer was then fractionated over caustic in vacuo to obtain the following fractions:

(a) A mixture of dipentene, terpinene, terpinolene.
(b) Terpinyl methyl ether containing a small amount of 1,8-di-methoxymenthane. The yield of this fraction was 90% on the basis of the dipentene used.

*Example XIII*

A 100 gram sample of diethylene glycol terpinyl ether containing both mono and diterpinyl ether was agitated for 1.5 hours at a temperature of 75–125° C. with 4 grams of a supported nickel catalyst containing nickel (15%) and hydrogen under 500–1800 pounds per square inch pressure. The product was then separated from the catalyst by filtration, and was found to have a refractive index of 1.4645 as compared with the refractive index of 1.4718 for the original ether treated, and a thiocyanate value of 0 as compared with an original thiocyanate value of 37, indicating that it was totally saturated.

*Example XIV*

A 100 gram sample of ethylene glycol mono terpinyl ether having a refractive index of 1.482, a specific gravity 0.985 and a thiocyanate value of 130 was agitated for two hours at a temperature of 75–135° C., with 4 grams of nickel catalyst and hydrogen under a pressure of 1600–2400 pounds per square inch. After the catalyst was removed by filtration, the product was found to have a refractive index of 1.469, a specific gravity of 0.962, and a thiocyanate value of 10.

While Examples XIII and XIV specifically refer to the hydrogenation of terpene ethers of diethylene glycol and ethylene glycol, respectively, it will be appreciated that the specific procedure described may be similarly applied to any of the terpene ethers produced by Examples I–XII.

It will be understood that the details and examples hereinbefore set forth are illustrative only, and that the invention herein described and claimed is in no way limited thereby.

This application is a continuation-in-part of my copending application, Serial No. 67,704, filed March 7, 1936.

What I claim and desire to protect by Letters Patent is:

1. A terpene ether produced from an unsaturated terpene compound by reacting an alcohol at a double bond of an unsaturated terpene compound, and then hydrogenating the resulting ether to reduce the remaining unsaturation therein.

2. A terpene ether produced from an unsaturated terpene hydrocarbon by reacting an alcohol at a double bond of an unsaturated terpene hydrocarbon, and then reducing the remaining unsaturation of the resulting compound by hydrogenation.

3. A terpene ether produced from an unsaturated terpene alcohol by reacting an alcohol at a double bond contained in an unsaturated terpenic group in said terpene alcohol, and then reducing the remaining unsaturation of the resulting compound by hydrogenation.

4. A terpene ether produced from an unsaturated terpene compound by reacting a polyhydric alcohol at a double bond contained in an unsaturated terpenic group in said terpene compound, and then reducing the remaining unsaturation of the resulting compound by hydrogenation.

5. A terpene ether produced from an unsaturated terpene compound by reacting a monohydric alcohol to a double bond contained in an unsaturated terpenic group in said terpene compound, and then reducing the remaining unsaturation of the resulting compound by hydrogenation.

6. A terpene ether produced by reacting an alcohol at a double bond of pinene and then reducing the remaining unsaturation of the resulting product by hydrogenation.

7. A terpene ether produced by reacting an alcohol at a double bond of dipentene and then reducing the remaining unsaturation of the resulting product by hydrogenation.

8. A terpene ether produced by reacting a polyhydric alcohol at a double bond of pinene and then reducing the remaining unsaturation of the resulting product by hydrogenation.

9. A terpene ether produced by reacting a polyhydric alcohol at a double bond of terpinene and then reducing the remaining unsaturation of the resulting product by hydrogenation.

10. A terpene ether produced from an unsaturated terpene compound by reacting a glycol at a double bond of an unsaturated terpene compound and then reducing the remaining unsaturation of the resulting product by hydrogenation.

11. A terpene ether produced from an unsaturated compound by reacting a glycol at a double bond of pinene and then reducing the remaining unsaturation of the resulting product by hydrogenation.

12. A terpene ether produced from an unsaturated compound by reacting a glycol at a double bond of terpinene and then reducing the remaining unsaturation of the resulting product by hydrogenation.

13. The method of producing a terpene ether which includes reacting an alcohol at a double bond of an unsaturated terpenic group contained in a terpene compound in the presence of a suitable acidic catalyst, and then treating this product with hydrogen in the presence of a hydrogenation catalyst, to reduce its unsaturation.

14. The method of producing a terpene ether which includes reacting an alcohol at a double bond of an unsaturated terpenic group contained in a terpene compound in the presence of a sulfonic acid catalyst and then treating this product with hydrogen in the presence of a hydrogenation catalyst to reduce its unsaturation.

15. The method of producing a terpene ether which includes reacting an alcohol at a double bond of an unsaturated terpenic group contained in a terpene compound in the presence of a suitable acidic catalyst and then treating this product with hydrogen in the presence of a nickel hydrogenation catalyst to reduce its unsaturation.

16. The method of producing a terpene ether which includes reacting an alcohol at a double bond of an unsaturated terpenic group contained in a terpene compound in the presence of a suitable acidic catalyst and then treating this product with hydrogen under a pressure of about 10 to about 1000 atmospheres per square inch, in the presence of a nickel hydrogenation catalyst, to reduce its unsaturation.

IRVIN W. HUMPHREY.